US009369862B2

(12) United States Patent
Karlsson

(10) Patent No.: US 9,369,862 B2
(45) Date of Patent: Jun. 14, 2016

(54) VEHICLE COMMUNICATION SYSTEM

(75) Inventor: Mats Karlsson, Göteborg (SE)

(73) Assignee: ICOMERA AB, Gothenburg (SE)

( * ) Notice: Subject to any disclaimer, the term of this patent is extended or adjusted under 35 U.S.C. 154(b) by 290 days.

(21) Appl. No.: 13/459,883

(22) Filed: Apr. 30, 2012

(65) Prior Publication Data

US 2012/0275445 A1    Nov. 1, 2012

(30) Foreign Application Priority Data

Apr. 29, 2011    (EP) .................................... 11164291

(51) Int. Cl.
| | |
|---|---|
| H04B 1/3822 | (2015.01) |
| H04W 8/18 | (2009.01) |
| H04B 1/3816 | (2015.01) |
| H04W 12/06 | (2009.01) |
| H04W 48/18 | (2009.01) |
| H04W 84/00 | (2009.01) |
| H04W 88/10 | (2009.01) |

(52) U.S. Cl.
CPC .............. *H04W 8/183* (2013.01); *H04B 1/3816* (2013.01); *H04B 1/3822* (2013.01); *H04W 12/06* (2013.01); *H04W 48/18* (2013.01); *H04W 84/005* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 2007/0030857 A1 | 2/2007 | Fulknier et al. | |
| 2007/0110017 A1 | 5/2007 | Fulknier et al. | |
| 2009/0059899 A1* | 3/2009 | Bendelac | 370/352 |
| 2010/0234071 A1* | 9/2010 | Shabtay et al. | 455/562.1 |
| 2010/0240414 A1* | 9/2010 | Lotenberg | 455/558 |
| 2010/0279698 A1 | 11/2010 | Wong | |
| 2011/0019651 A1 | 1/2011 | Fulknier et al. | |
| 2011/0051703 A1 | 3/2011 | Fulknier et al. | |
| 2011/0117962 A1* | 5/2011 | Qiu et al. | 455/558 |
| 2011/0237297 A1* | 9/2011 | Shin | 455/558 |
| 2011/0269503 A1* | 11/2011 | Park et al. | 455/552.1 |
| 2012/0026993 A1* | 2/2012 | Radpour | H04W 4/021 370/338 |
| 2012/0135715 A1* | 5/2012 | Kang et al. | 455/412.1 |
| 2012/0142397 A1* | 6/2012 | Jordan et al. | 455/556.1 |
| 2013/0301584 A1* | 11/2013 | Addepalli et al. | 370/329 |

FOREIGN PATENT DOCUMENTS

| | | |
|---|---|---|
| GB | 2381418 A | 4/2003 |
| GB | 2439370 A | 12/2007 |
| WO | WO-0067435 A1 | 11/2000 |

OTHER PUBLICATIONS

European Search Report.

* cited by examiner

*Primary Examiner* — Marcus R Smith
(74) *Attorney, Agent, or Firm* — Harness, Dickey & Pierce PLC

(57) ABSTRACT

A vehicle communication system is disclosed, for use on e.g. trains, ferries and busses. The system includes an internal local area network (LAN) arranged within the vehicle; at least one antenna for wireless communication with external wide area networks (WAN) outside the vehicle; and a data communication router for providing data communication between said internal LAN and said external WANs. The data communication router includes a plurality of modems for communication with said external WANs, a subscriber identity module (SIM) pool including a plurality of SIMs, and a controller capable of periodically assigning SIMs within said SIM pool to any one of said modems. Hereby, a very efficient use of the modems and SIMs is obtained, leading to a less costly system and a more efficient communication.

17 Claims, 1 Drawing Sheet

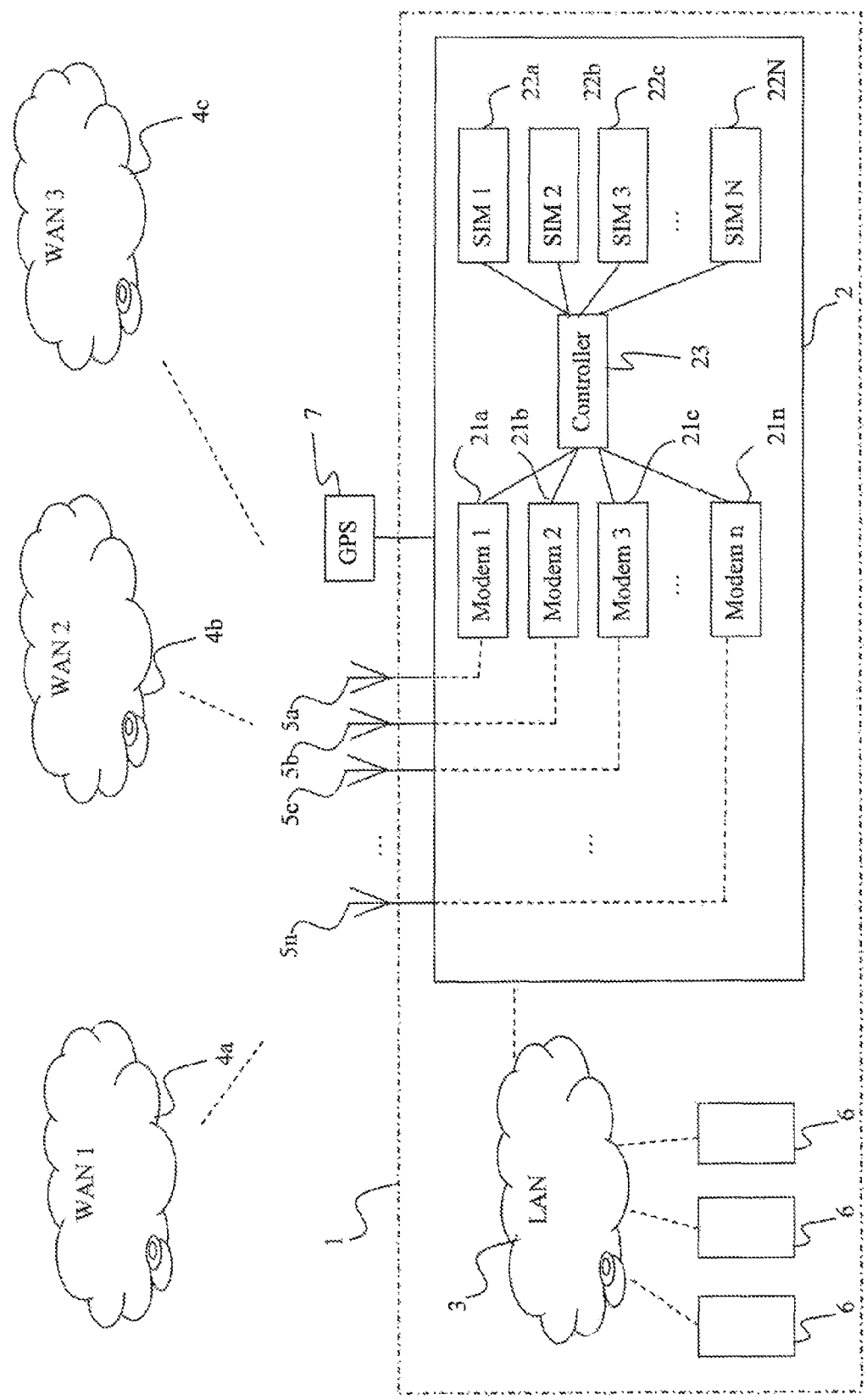

VEHICLE COMMUNICATION SYSTEM

PRIORITY STATEMENT

The present application hereby claims priority under 35 U.S.C. §119 to European patent application number EPC 11164291.4 filed Apr. 29, 2011, the entire contents of which are hereby incorporated herein by reference.

TECHNICAL FIELD OF THE INVENTION

The present invention relates to a vehicle communication system. The invention is also related to a corresponding method for providing access to external networks from on-board a vehicle.

BACKGROUND

There is today an increasing demand from passengers to be able to communicate through mobile phones and other hand-held terminals when travelling on public transportation vehicles, such as trains, ferries and busses, and also to be able to get access to the Internet with laptops, PDAs etc. However, vehicles of this type are made of metal, and even the windows are often covered with a metal film. Further, vehicles often move between different coverage areas. Thus, direct communication between terminal antennas within the vehicles and externally located antennas is difficult to obtain.

To this end, such vehicles are often provided with an external antenna connected to a data communication router within the carriage, which in turn is connected to an internal local area network (LAN). Hence, the communication between the passengers' terminals and the operator antennas outside the vehicle, and corresponding wide area networks (WANs), occurs through the data communication router. This has been found to be an efficient way of providing e.g. Internet access on-board public transportation vehicles. Such mobile access router solutions are e.g. commercially available from the applicant of the present application, Icomera AB, of Gothenburg, Sweden.

However, today's systems are not entirely satisfactory. In order to provide continuous access, the data communication router typically need to include a plurality of modems, and each modem often needs access to a plurality of subscriber identity modules (SIMs), which makes the communication unit rather large and costly. Further, it may still be difficult to obtain a cost-efficient data communication at all times. In particular this is a problem for vehicles passing country borders, since there is typically different operators handling the WANs in different countries, and roaming between different operators, or even between different WANs belonging to the same operator, is normally very costly. As cross-border travelling is ever increasing, it is nowadays not unusual that the same train crosses up to four country borders on a single journey, and busses and ferries often cross even more borders.

Another drawback with today's systems is that there is a frequent need for upgrading of the systems, requiring update or exchange of modems and SIMs, which in today's systems is rather costly.

Still another problem associated with the present solutions is that even though it is sometimes possible to use a common antenna for several modems, this impairs the quality and efficiency of the transmission, and consequently it is often necessary to have at least one antenna, and possibly even two or more, dedicated to each modem. However, installation and maintenance of antennas is rather costly, and the overall costs increases significantly with every new antenna that is needed.

There is therefore a need for an improved vehicle communication system which provides better capacity and/or lowers the overall costs of installing and maintaining the system.

SUMMARY OF THE INVENTION

It is therefore an object of the present invention to provide a vehicle communication system and a corresponding method which alleviates all or at least some of the above-discussed drawbacks of the presently known systems.

This object is achieved by means of a vehicle communication system and a method for communication as defined in the appended claims.

According to a first aspect of the invention, there is provided a vehicle communication system, comprising:

an internal local area network (LAN) arranged within the vehicle;

at least one antenna for wireless communication with external wide area networks (WAN) outside the vehicle; and a data communication router for providing data communication between said internal LAN and said external WANs, wherein said data communication router comprises a plurality of modems for communication with said external WANs, a subscriber identity module (SIM) pool including a plurality of SIMs, and a controller capable of periodically assigning SIMs within said SIM pool to any one of said modems.

The term "periodically" is here used to indicate a assignment which is not fixed, but which is established temporarily, for a certain period of time. These periodical assignments are preferably established in an optimized way, based on one or several optimization rules handled by the controller, as is discussed in more detail in the following.

Subscriber Identity Modules (SIMs) are per se known, and used to identify and authenticate a user to a wireless network so that the network can authorize the user to set-up data transmissions and calls. A SIM includes a processor and memory, and some types of SIMs are in the form of SIM cards, which can be removed from the SIM holder. A Universal Subscriber Identity Module (USIM) is a next-generation SIM. Hereinafter, both SIMs and USIMs will be collectively referred to as SIMs.

The present invention is based on the realization that from time to time, only one SIM is used by a modem, or that modems periodically does not even use one SIM. Further, the available SIMs are often used less frequently during periods. Accordingly, by using a common pool of SIMs, accessible for a plurality of modems, the total number of SIMs may be reduced, and the SIMs available may be used more efficiently. At the same time, the accessibility for each modem to an adequate SIM at each time increases, since the number of accessible SIMs for each modem increases. Accordingly, the use of the available SIMs can hereby be managed more efficiently.

In particular, it hereby becomes possible to provide access for each modem to one or several suitable SIM(s) in every country in which the vehicle may travel.

Further, due to the centralization of the SIMs into a common SIM pool, upgrading and exchange of SIMs and modems are facilitated and made less costly.

The present invention also makes it possible to reduce the number of modems required to establish adequate communication quality, since it now becomes possible to use each modem more efficiently. This reduces the overall costs of the system. Further, since it is often necessary to have at least one antenna, and possibly even two or more, dedicated to each modem, the use of fewer modems also leads to a reduction in the number of antennas required, and consequently additional cost-efficiency also for this reason.

Still further, the more efficient use of the modems and antennas rendered possible by means of the present invention also makes it possible to establish efficient communication solutions also for vehicles travelling cross borders which, for practical reasons, were previously not possible. Since more than one modem is often required for use simultaneously in each country, and since communication through several operators within each country is often necessary to obtain good communication quality, present solutions would require a large amount of modems and antennas, even if e.g. dual SIM cards are used for each modem. If you consider a system to be used in a plurality of countries, and 3-4 operators to be used in each country, the number of modems and antennas required soon becomes unsurmountable. Instead, the solution would be insufficient compromises, leading to fewer modems and antennas, and consequently a greatly impaired radio coverage and bandwidth.

With the present invention, a similar situation for use in e.g. five countries, and with four operators in each country, could be handled by four modems, or fewer, and a SIM pool of in total 20 SIMs. Similarly, more than 8 countries could be handled by the new communication system with a SIM pool of about 30 SIMs, even if four operators are to be used in each country. Even though it is possible to use a single external antenna in the communication system, there is preferably provided a plurality of antennas for wireless communication with external wide area networks (WAN). Most preferably, there is provided at least one antenna for wireless communication with external wide area networks (WAN) assigned to each of the modems. At least one of the modems may also have at least two antennas assigned to it. This enables the use of MIMO (multiple-input and multiple-output) and/or antenna diversity for the external communication to and from the data communication router. Hereby the data communication router may comprise several antenna ports per modem, enabling MIMO for the external communication, and the high bandwidth thereby provided can then be distributed to the internal clients on the vehicle with e.g. 802.11n.

The data communication router comprises at least two modems. However, preferably the data communication router comprises at least four modems, and preferably at least six modems.

Further, the SIM pool comprises at least two different SIMs. However, preferably the SIM pool comprises at least six SIMs, and preferably at least 12 SIMs. However, the system architecture is easily scalable, and up to 30 SIMs may be provided, or even more.

Preferably, the SIM pool is realized by means of a SIM card holder arranged to receive a plurality of SIM cards.

The assignment of SIMs to modems at every specific time is preferably determined based on a set of rules in the controller. The set of rules may e.g. be used to assign SIMs to the modems based on information such as in which country the vehicle is currently travelling, the amount of data that has been conveyed by use of the different SIMs, the current price related to conveying data through the different SIMs, the type of data being conveyed, etc.

In a preferred embodiment, at least some of the SIMs are related to operators in different countries, whereby the controller is arranged to assign SIMs within the SIM pool to the modems in dependence on in which country the vehicle is currently located. In particular, it is preferred that the system comprises a global positioning system (GPS) receiver for receiving GPS signals indicative of the current position of the vehicle, and wherein the controller is arranged to assign SIMs within said SIM pool to the modems in dependence on said received GPS signals. However, determination of which country the vehicle is currently located may also be automatically determined in other ways, or even selected manually.

Additionally or alternatively, at least one of the SIMs may be associated with restrictions related to the amount of data which has been conveyed by means of said SIM, whereby the controller can be arranged to assign SIMs within said SIM pool to the modems in dependence on the amount of data which has been conveyed through the different SIMs. For example, restrictions may be provided limiting the total amount of data that may be conveyed over a certain time period, or setting different prices for data transfer when certain limits have been exceeded.

The controller is preferably arranged to assign each SIM within said SIM pool only to one modem at a time. Hereby, each SIM at any given time only has one user, but the assigned user may vary over time.

Further, the controller is preferably arranged to periodically assign at least two SIMs within said SIM pool to a single modem, wherein said modem is further arranged to communicate on at least two different communication routes being provided by said at least two SIMs, and preferably to automatically separate the data traffic between said communication routes based on specific optimization conditions, such as price and/or speed. Such simultaneous use of different communication routes is per se known, but is rendered more efficient by means of the use of a SIM pool.

Preferably, the at least two different communication routes being used simultaneously have different characteristics. Hereby, the communication can be automatically optimized based on specific conditions, such as price, speed, etc. Such data communication routers are known from EP 1 175 757 by the same applicant, said document hereby incorporated by reference. Such routers are also commercially available from the applicant, Icomera AB. Hereby, the router may use all available data channels, such as two or more of e.g. GSM, Satellite, DVB-T, HSPA, EDGE, 1×RTT, EVDO, LTE, WiFi (802.11) and WiMAX; and combine them into one virtual network connection. An automatic selection is then made among the available channels to use the most cost effective combination that fulfils the users' availability, bandwidth and reliability requirements. Hence, a seamless distribution of the data among said different channels is obtained.

The vehicle communication system of the present invention may be used on essentially any moving vehicle. However, it is particularly useful for public transportation vehicles, and especially on busses, ferries and trains.

According to another aspect of the invention, there is provided a method for providing access to external networks from on-board a vehicle, comprising:

providing an internal local area network (LAN) arranged within the vehicle;

providing at least one antenna for wireless communication with external wide area networks (WAN) outside the vehicle;

providing a data communication router for providing data communication between said internal LAN and said external WANs, wherein said data communication router comprises a plurality of modems for communication with said external WANs and a pool including a plurality of SIMs, each of said SIMs being accessible for each of said modems;

selecting a modem for use; and periodically assigning said modem to at least one subscriber identity module (SIM) within said.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein:

FIG. 1 is an schematic illustration of a vehicle comprising a communication system in accordance with an embodiment of the present invention.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of e present invention, it will be apparent to one skilled in the art that the present invention may be practiced without these specific details. In other instances, well known constructions or functions are not described in detail, so as not to obscure the present invention.

In FIG. 1 a schematic illustration of a vehicle 1, such as a train, having a communication system is provided. The communication system comprises a data communication router 2 for receiving and transmitting data between an internal local area network (LAN) 3, and a plurality of external wide area networks (WANs) 4a, 4b, 4c. Communication to and from the WANs is provided through one or several antennas 5 a-n on the vehicle roof. Preferably, a plurality of antennas are used, and most preferably at least one antenna is assigned to each modem, as is schematically illustrated in FIG. 1. In case e.g. MIMO is to be used, more than one antenna may also be assigned to each modem.

The LAN is preferably a wireless network, using one or several internal antennas to communicate with terminal units 6 within the vehicle. To this end, it is e.g. feasible to use a distributed antenna, such as a leaky feeder extending through the vehicle, but other types of antennas may also be used. It is also possible to use a wired network within the vehicle.

The data communication router comprises a plurality of modems 21 a-n. The number of modems is at least two, but preferably at least four, and most preferably at least six. Further, the data communication router comprises a plurality of SIMs 22 a-N. The number of SIMs is at least two, but preferably at least six, and most preferably at least twelve. The SIMs form a common SIM pool, accessible for all the modems 21 a-n. The SIMs are preferably SIM cards, and the SIM pool is realized as a SIM card holder, comprising a plurality of slots for receiving a plurality of SIM cards.

Periodical assignment of one or several of the SIM(s) to any modem is controlled by a controller 23. The controller is preferably realized as a software controlled processor. However, the controller may alternatively be realized wholly or partly in hardware.

The assignment of SIMs to modems at every specific time is preferably determined based on a set of rules in the controller. The set of rules may e.g. be used to assign SIMs to the modems based on information such as in which country the vehicle is currently travelling, the amount of data that has been conveyed by use of the different SIMs, the current price related to conveying data through the different SIMs, the type of data being conveyed, etc.

In a preferred embodiment, at least some of the SIMs are related to operators in different countries, whereby the controller is arranged to assign SIMs within the SIM pool to the modems in dependence on in which country the vehicle is currently located. In particular, it is preferred that the system comprises a global positioning system (GPS) receiver 7 for receiving GPS signals indicative of the current position of the vehicle, and wherein the controller is arranged to assign SIMs within said SIM pool to the modems in dependence on said received GPS signals.

Additionally or alternatively, at least one of the SIMs may be associated with restrictions related to the amount of data which has been conveyed by means of said SIM, whereby the controller can be arranged to assign SIMs within said SIM pool to the modems in dependence on the amount of data which has been conveyed through the different SIMs. For example, restrictions may be provided limiting the total amount of data that may be conveyed over a certain time period, or setting different prices for data transfer when certain limits have been exceeded.

The controller is preferably arranged to assign each SIM within said SIM pool only to one modem at a time. Hereby, each SIM at any given time only has one user, but the assigned user may vary over time.

The data communication router may also be denominated MAR (Mobile Access Router) or MAAR (Mobile Access and Applications Router).

Each modem in the data communication router is preferably arranged to communicate on at least two different communication routes having different characteristics. Hereby, the communication can be automatically optimized based on specific conditions, such as price, speed, etc. Such data communication routers are known from EP 1 175 757 by the same applicant, said document hereby incorporated by reference. Such routers are also commercially available from the applicant, Icomera AB. Hereby, the router may use all available data channels, such as two or more of e.g. GSM, Satellite, DVB-T, HSPA, EDGE, 1×RTT, EVDO, LTE, WiFi (802.11) and WiMAX; and combine them into one virtual network connection. An automatic selection is then made among the available channels to use the most cost effective combination that fulfils the users' availability, bandwidth and reliability requirements. Hence, a seamless distribution of the data among said different channels is obtained.

The invention has now been described with reference to specific embodiments. However, several variations of the communication system are feasible. For example, the number of modems and SIMs may be varied. Further, the communication system may be used on various types of vehicles. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A vehicle communication system, comprising:
    an internal local area network (LAN) arranged within a train;
    at least one antenna for wireless communication with external wide area networks (WAN) outside the train; and
    a data communication router for providing data communication between said internal LAN and said external WANs, wherein said data communication router includes a plurality of modems for communication with said external WANs, a subscriber identity module (SIM)

pool including a plurality of SIMs, the SIM pool including several SIMs related to different operators for each of a plurality of different countries, a global positioning system (GPS) receiver for receiving GPS signals indicative of the current position of the train, and a controller capable of periodically assigning any one of the SIMs within said SIM pool to any one of said modems, wherein the controller is arranged to assign SIMs within said SIM pool to the modems in accordance to which country the train is currently located, as determined by the GPS signals.

2. The vehicle communication system of claim 1, wherein the data communication router comprises at least four modems.

3. The vehicle communication system of claim 1, wherein the SIM pool comprises at least six SIMs.

4. The vehicle communication system of claim 1, wherein at least one of the SIMs is associated with restrictions related to an amount of data which has been conveyed by said SIM, whereby the controller is arranged to assign SIMs within said SIM pool to the modems in accordance on the amount of data which has been conveyed through the different SIMs.

5. The vehicle communication system of claim 1, wherein the controller is arranged to assign each SIM within said SIM pool only to one modem at a time.

6. The vehicle communication system of claim 1, wherein the controller is arranged to periodically assign at least two SIMs within said SIM pool to a single modem, wherein said modem is further arranged to communicate on at least two different communication routes being provided by said at least two SIMs.

7. The vehicle communication system of claim 1, wherein the WAN operates in accordance with at least one of the standards: GSM, 3G UMTS, Satellite, DVB-T, HSPA, EDGE, 1×RTT, EVDO, LTE, WiFi (802.11) and WiMAX.

8. The vehicle communication system of claim 1, wherein the SIM pool comprises a SIM card holder arranged to receive a plurality of SIM cards.

9. The vehicle communication system of claim 1, wherein a plurality of antennas for wireless communication are provided with the external wide area networks (WAN).

10. The vehicle communication system of claim 9, wherein at least one antenna for wireless communication with external wide area networks (WAN) is assigned to each of said modems.

11. The vehicle communication system of claim 2, wherein the data communication router comprises at least six modems.

12. The vehicle communication system of claim 2, wherein the SIM pool comprises at least six SIMs.

13. The vehicle communication system of claim 6, wherein said modem is further arranged to communicate on at least two different communication routes being provided by said at least two SIMs to automatically separate the data traffic between said communication routes based on specific optimization conditions.

14. The vehicle communication system of claim 13, wherein the specific optimization conditions include at least one of price and speed.

15. A method for providing access to external networks from on-board a train, comprising:
providing an internal local area network (LAN) arranged within the train;
providing at least one antenna for wireless communication with external wide area networks (WAN) outside the train;
providing a data communication router for providing data communication between said internal LAN and said external WANs, wherein said data communication router includes a plurality of modems for communication with said external WANs and a pool including a plurality of SIMs, the SIM pool including several SIMs related to different operators for each of a plurality of different countries, each of said SIMs being accessible to any one of said modems;
receiving global positioning system (GPS) signals indicative of the current position of the train,
selecting a modem for use;
periodically assigning said modem to at least one subscriber identity module (SIM); and
assigning SIMs within said SIM pool to the modems in accordance to which country the train is currently located, as determined by the GPS signals.

16. A vehicle communication system, comprising:
an internal local area network (LAN) arranged within a vehicle;
at least one antenna for wireless communication with external wide area networks (WAN) outside the vehicle; and
a data communication router for providing data communication between said internal LAN and said external WANs, wherein said data communication router includes a plurality of modems for communication with said external WANs, a subscriber identity module (SIM) pool including a plurality of SIMs, and a controller capable of periodically assigning any one of the SIMs within said SIM pool to any one of said modems,
wherein the data communication router is further arranged to communicate on at least two different and concurrently useable communication routes provided by said modem(s) and said SIMs, said communication routes having different characteristics, the two communication routes being used in combination to form a single virtual network connection.

17. The vehicle communication system of claim 1, wherein the data communication router is further arranged to communicate on at least two different and concurrently useable communication routes provided by said modem(s) and said SIMs, said communication routes having different characteristics, the two communication routes being used in combination to form a single virtual network connection.

* * * * *